United States Patent
Kolekar

(10) Patent No.: US 10,542,387 B2
(45) Date of Patent: Jan. 21, 2020

(54) REDUCING CONNECTION TIME IN DIRECT WIRELESS INTERACTION

(71) Applicant: Abhijeet Kolekar, Hillsboro, OR (US)

(72) Inventor: Abhijeet Kolekar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/026,491

(22) PCT Filed: Dec. 18, 2013

(86) PCT No.: PCT/US2013/076044
§ 371 (c)(1),
(2) Date: Mar. 31, 2016

(87) PCT Pub. No.: WO2015/094216
PCT Pub. Date: Jun. 25, 2015

(65) Prior Publication Data
US 2016/0249396 A1   Aug. 25, 2016

(51) Int. Cl.
*H04W 4/06* (2009.01)
*H04W 76/14* (2018.01)
(Continued)

(52) U.S. Cl.
CPC .......... *H04W 4/06* (2013.01); *H04W 12/003* (2019.01); *H04W 76/14* (2018.02); *H04W 12/06* (2013.01); *H04W 84/12* (2013.01)

(58) Field of Classification Search
None
See application file for complete search history.

(56) References Cited

U.S. PATENT DOCUMENTS 8,892,722 B1 * 11/2014 Kopikare ............... G06F 15/173
                                                        370/329
8,954,502 B1 *  2/2015 Kopikare ............ H04L 67/1051
                                                        709/204

(Continued)

OTHER PUBLICATIONS

International Search Report and Written Opinion from related application PCT/US2013/076044 dated Sep. 18, 2014.
(Continued)

*Primary Examiner* — Noel R Beharry
*Assistant Examiner* — Rodrick Mak
(74) *Attorney, Agent, or Firm* — Grossman, Tucker, Perreault & Pfleger, PLLC

(57) ABSTRACT

This disclosure is directed to reducing connection time in direct wireless interaction. Devices may interact via direct (e.g., device-to-device or "D2D") wireless communication. As part of connection setup operations, a device may receive an invitation to join an existing wireless group. For example, an invitation message may be received by the device on at least one known beaconing channel. The invitation message received by the device may at least identify an operating channel on which connection establishment operations will commence. Following completion of the connection setup operations, the device may initiate scanning on the operating channel identified by the invitation message to expedite the start of connection establishment operations. After connection establishment operations are complete, the device may be able to interact with at least one other device via direct wireless interaction.

13 Claims, 5 Drawing Sheets

(51) Int. Cl.
*H04W 12/00* (2009.01)
*H04W 12/06* (2009.01)
*H04W 84/12* (2009.01)

(56) References Cited

U.S. PATENT DOCUMENTS

| | | | | |
|---|---|---|---|---|
| 2011/0149816 | A1* | 6/2011 | Saito | H04W 4/08 |
| | | | | 370/310 |
| 2011/0188391 | A1 | 8/2011 | Sella et al. | |
| 2012/0026941 | A1* | 2/2012 | Ahmad | H04W 48/16 |
| | | | | 370/328 |
| 2012/0134349 | A1* | 5/2012 | Jung | H04W 8/005 |
| | | | | 370/338 |
| 2012/0147825 | A1* | 6/2012 | Hassan | H04L 12/2818 |
| | | | | 370/329 |
| 2012/0155350 | A1* | 6/2012 | Wentink | H04W 8/005 |
| | | | | 370/311 |
| 2012/0265913 | A1 | 10/2012 | Suumaki et al. | |
| 2012/0290730 | A1 | 11/2012 | Desai et al. | |
| 2012/0315841 | A1* | 12/2012 | Zhou | H04B 7/2606 |
| | | | | 455/11.1 |
| 2013/0223361 | A1* | 8/2013 | Park | H04W 12/04 |
| | | | | 370/329 |
| 2013/0227152 | A1* | 8/2013 | Lee | H04W 48/16 |
| | | | | 709/227 |
| 2013/0311692 | A1 | 11/2013 | Huang et al. | |
| 2014/0211705 | A1* | 7/2014 | Baek | H04W 76/023 |
| | | | | 370/329 |
| 2015/0117340 | A1* | 4/2015 | Kawakami | H04W 76/14 |
| | | | | 370/329 |
| 2015/0181633 | A1* | 6/2015 | Kim | H04W 8/005 |
| | | | | 370/329 |

OTHER PUBLICATIONS

International Preliminary Report on Patentability from related application PCT/US2013/016044 dated Jun. 21, 2016.
Chinese Office Action received in Chinese Patent Application No. 201380080879.9, dated Oct. 8, 2018, 16 pages.
Chinese Office Action received in Chinese Patent Application No. 201380080879.9, dated Jul. 8, 2019.

* cited by examiner

US 10,542,387 B2

REDUCING CONNECTION TIME IN DIRECT WIRELESS INTERACTION

TECHNICAL FIELD

The present disclosure relates to wireless communication, and more particularly, to reducing the time involved in establishing a connection in direct wireless interaction.

BACKGROUND

As communication technology evolves, new applications are emerging for wireless electronic communication. For example, wireless communication has gone beyond simple cellular-based voice communication and is now being employed for a variety of data-related applications. Mobile communication devices (e.g., smart phones), mobile computing devices (e.g., tablet computers), etc. may employ long-range wireless mediums in support of a variety of applications. However, in some instances wireless interaction may occur via a short-range wireless medium (e.g., within a range of about 65 feet) or a close-proximity wireless medium (e.g., within a range of about a couple of inches). Short-range and close-proximity wireless mediums such as wireless local area networking (WLAN), Bluetooth, radio frequency (RF) such as based on RF Identification (RFID) or Near Field Communication (NFC) standards, infrared (IR), etc. may have some advantages over long-range wireless communication in that they are adequate for short-range or close-proximity interaction while being unregulated, and thus free to user without a license. As a result, the use of short-range and close-proximity wireless communication is expanding in many currently available wireless-enabled devices.

At least one issue with the use of some short-range wireless communication mediums is the need for an intervening access point (AP). For example, WLAN or "Wi-Fi" operating in accordance with the IEEE 802.11 wireless standard is designed to employ an AP to control wireless traffic. An AP is not required in Bluetooth networks, which was initially designed as a wireless replacement for wired peripheral connections. The desire for device-to-device (D2D) wireless connectivity, such as provided by Bluetooth, with the stability, throughput, security, equipment availability, etc. of Wi-Fi has yielded "Wi-Fi Direct" or "Wi-Fi Person-to-Person (P2P)." Wi-Fi Direct allows Wi-Fi-enabled devices to interact directly without the need for specialized equipment (e.g., a Bluetooth transceiver). While beneficial on its face, in practice the establishment of Wi-Fi direct connections may suffer from delays due to the formalities of Wi-Fi operation. In particular, Wi-Fi Direct connections may take a long time to establish, which may negatively impact the quality of service (QoS) experienced by users.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
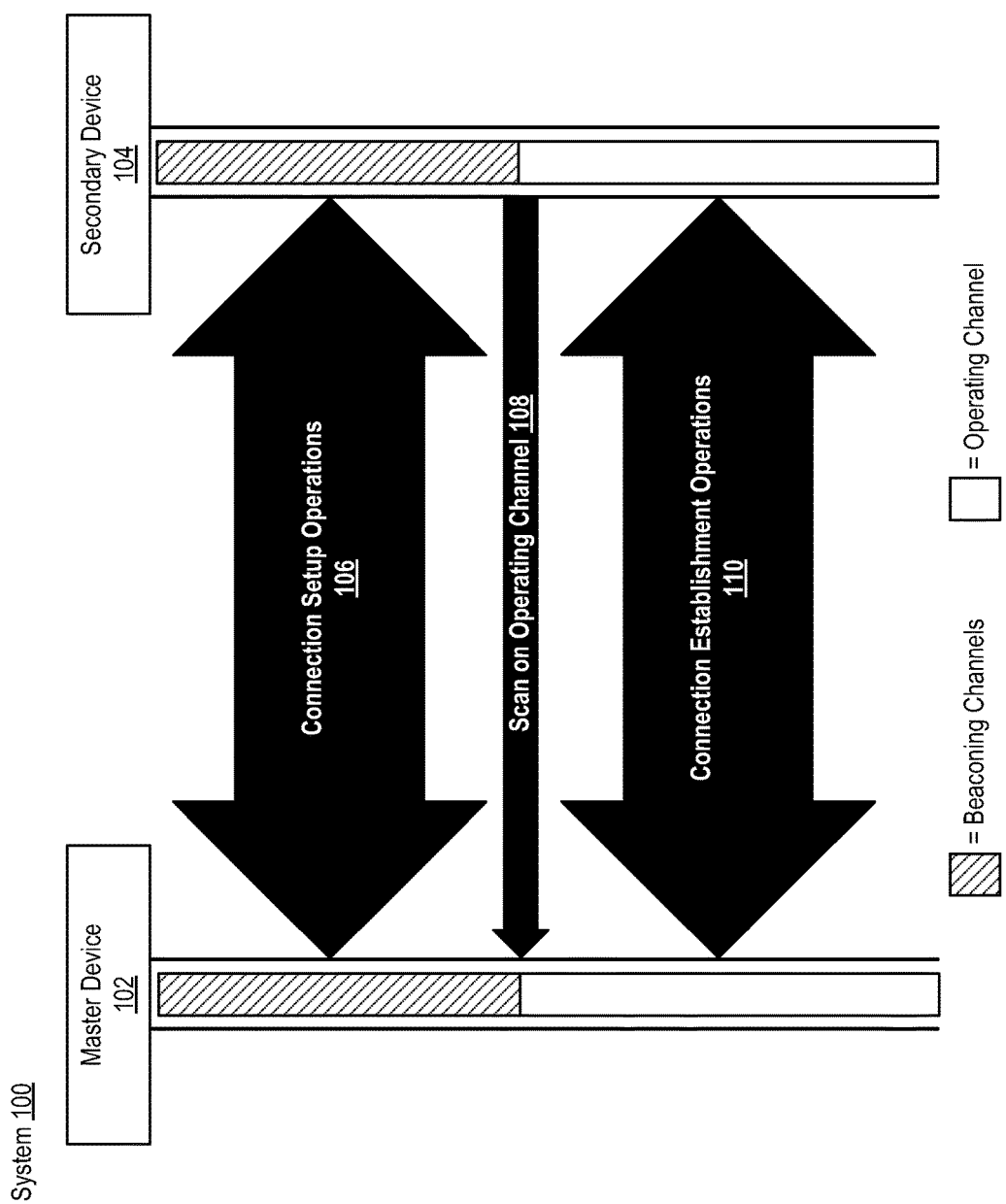
FIG. 1 illustrates an example system configured for reducing connection time in direct wireless interaction in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to reducing connection time in direct wireless interaction. Devices may interact via direct (e.g., device-to-device or "D2D") wireless communication such as, for example, Wi-Fi Direct based on the IEEE 802.11 wireless standard such as in Wireless Display technology (WiDi) developed by the Intel Corporation, etc. As part of connection setup operations, a device may receive an invitation to join an existing wireless group. For example, an invitation message may be received by the device on at least one known beaconing channel. The invitation message received by the device may at least identify an operating channel on which connection establishment operations will commence. Following completion of the connection setup operations, the device may initiate scanning on the operating channel identified by the invitation message to expedite the start of connection establishment operations. After connection establishment operations are complete, the device may be able to interact with at least one other device via direct wireless interaction.

In one embodiment, a device configured to reduce connection time via direct wireless interaction may comprise, for example, at least a communication module and a connection module. The communication module may be to engage in direct wireless interaction with at least one other device. The connection module may be to cause the communication module to engage in connection setup operations with the at least one other device, determine an operating channel for the direct wireless interaction based on the connection setup operations and cause the communication module to engage in connection establishment operations with the at least one other device on the operating channel.

In one embodiment, direct wireless interaction may be based on Wi-Fi Direct communication in accordance with the IEEE 802.11 wireless standard. For example, connection setup operations may occur on at least one beaconing channel known to devices communicating via Wi-Fi Direct. Example connection setup operations may comprise at least receiving an invitation to join a direct wireless interaction group. The invitation to join a direct wireless interaction group may comprise, for example, at least an invitation request message received via the communication module, the invitation request message at least identifying the operating channel. The connection module being to determine an operating channel may comprise the connection module being to obtain the operating channel from the invitation request message. Moreover, the connection module being to cause the communication module to engage in connection establishment operations may comprise the connection module being to cause the communication module to scan on the operating channel.

In the same or a different embodiment, the connection module being to cause the communication module to engage in connection establishment operations may comprise, for example, the connection module being to cause the communication module to at least transmit at least one of authentication-related, association-related or security-related messages on the operating channel. The communication module may further be to interact with the at least one other device via the direct wireless connection established on the operating channel. An example method for reducing connection time via direct wireless interaction consistent with the present disclosure may comprise causing a communication module in a device to engage in connection setup operations for direct wireless interaction with at least one other device, determining an operating channel for the direct wireless interaction based on the connection setup operations and causing the communication module to engage in connection establishment operations with the at least one other device on the operating channel.

FIG. 1 illustrates an example system configured for reducing connection time in direct wireless interaction in accordance with at least one embodiment of the present disclosure. It is important to note that while reference may be made to established wireless communication protocols like WLAN, Wi-Fi, Wi-Fi Direct, WiDi, etc., that these references are made herein merely for the sake of explanation. Embodiments consistent with the present disclosure are not limited to implementation using only these wireless communication mediums, and may be implemented with other wireless communication mediums having similar characteristics.

System 100 may comprise master device 102 and at least one secondary device 104. Examples of master device 102 and secondary device 104 may comprise, but are not limited to, a mobile communication device such as a cellular handset or a smartphone based on the Android® OS, iOS®, Windows® OS, Mac OS, Tizen OS, Firefox OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a typically stationary computing device such as a desktop computer, a standalone or rack-mounted server, a smart television, small form factor computing solutions (e.g., for space-limited applications, multimedia applications like television integrated media servers, etc.) like the Next Unit of Computing (NUC) platform from the Intel Corporation, etc.

In general, master device 102 may be the initiator of a direct wireless connection to at least one secondary device 104. In one example scenario, master device 102 may be a mobile communication device comprising multimedia content (e.g., text, audio, images, video, etc.) and a user of a device 102 may desire to have the multimedia content presented wirelessly on secondary device 104, which may comprise audio and/or video presentation resources such as a display, monitor, television, etc. This example WiDi interaction may be orchestrated using Wi-Fi Direct communication. In Wi-Fi direct, master device 102 may take on the role of an AP, advertising the availability of a wireless network (e.g., group) that at least one secondary device 104 may join. Consistent with the present disclosure, the consummation of a direct wireless connection between master device 102 and secondary device 104 may comprise at least two parts: connection setup operations 106 and connection establishment operations 110.

Connection setup operations 106 may comprise, for example, advertising availability of a group and, in some instances, authentication of secondary device 104. For example, a user of master device 102 may perform actions that result in connection setup operations 106 being performed. Example actions may include the activation of an application that may use wireless communication, the manual activation of wireless communication features in master device 102, etc. Connection setup operations 106 may occur over a beaconing channel (e.g., on one of a plurality of channels on which beaconing is known to occur) and may identify an operational channel for use by secondary device 104 in connection establishment operations 110. In one embodiment, an invitation message may be transmitted on a beaconing channel, the invitation message inviting devices like secondary device 104 to join a group including master device 102. Connection setup operations 106 may then proceed to handle any initial formalities needed to have secondary device 104 join the group being advertised by master device 102. In one embodiment, connection setup operations 106 may include authentication of secondary device 104 (e.g., to ensure master device 102 is interacting with the intended secondary device 104). Examples of connection setup operations 106 will be disclosed in more detail in regard to FIG. 3.

After completing connection setup operations 106, secondary device 104 may already be aware of the operating channel on which connection establishment operations 110 will be initiated. Thus, secondary device 104 may start to scan on the operation channel as shown at 108. Alternatively, secondary device 104 would have to scan all available wireless channels to determine where connection establishment operations 110 will occur. In the instance of Wi-Fi Direct, secondary device 104 would be forced to scan all 25 available channels locate the group owner (GO) of the Wi-Fi Direct group (e.g., master device 102). The need to scan all of the available channels can create unnecessary delay (e.g., 6 to 9 seconds based on the particular situation) that may affect the user's satisfaction with the technology. However, the ability for secondary device 104 to scan on the operating channel as shown at 108 may allow connection establishment to commence quickly. Connection establishment operations 110 may include all of the negotiation activities that need to occur between master device 102 and secondary device 104 to establish the direct wireless connection. More specially, following connection establishment operations 110 master device 102 and secondary device 104 may interact via a direct wireless connection (e.g., per the previous example, multimedia data may be provided by master device 102 for presentation on secondary device 104). Examples of connection establishment operations 110 will be disclosed in more detail in regard to FIG. 4.

Figure 2:
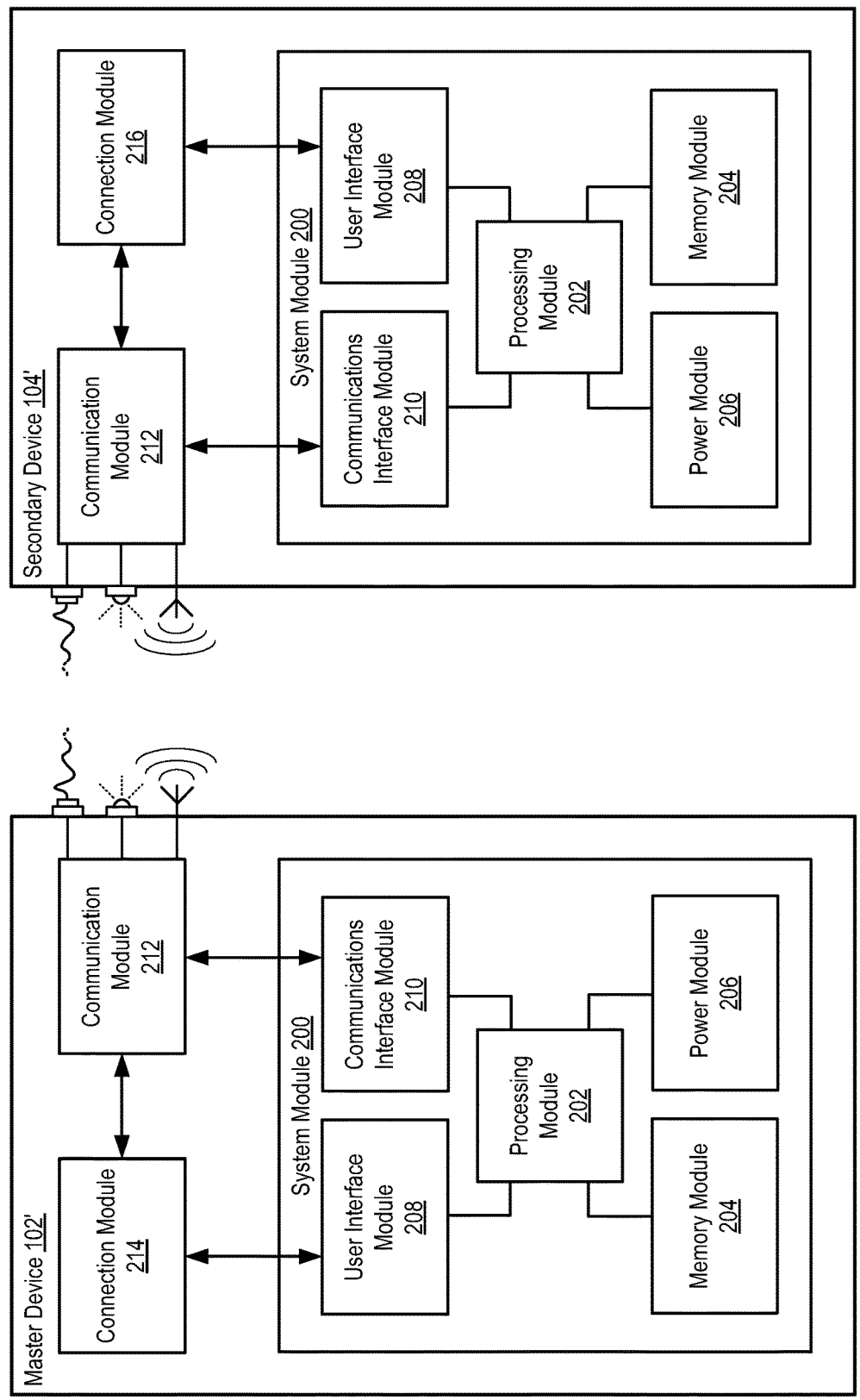
FIG. 2 illustrates an example configuration for a master device and secondary device in accordance with at least one embodiment of the present disclosure.

FIG. 2 illustrates an example configuration for a master device and secondary device in accordance with at least one embodiment of the present disclosure. In particular, master device 102' and secondary device 104' (collectively, "devices 102' and 104'") may be capable of performing example functionality such as disclosed in FIG. 1. However, devices 102' and 104' are meant only as an example of equipment usable in embodiments consistent with the present disclosure, and are not meant to limit these various embodiments to any particular manner of implementation.

Devices 102' and 104' may comprise, for example, system module 200 configured to manage device operations. System module 200 may include, for example, processing module 202, memory module 204, power module 206, user interface module 208 and communication interface module 210. Devices 102' and 104' may also include communication module 212 and connection modules 214 and 216, respectively. While communication module 212 and connection modules 214 and 216 have been shown as separate from system module 200, the example of FIG. 2 has been provided merely for the sake of explanation. For example, it may also be possible for some or all of the functionality associated with communication module 212 and/or connection modules 214 and 216 to be incorporated within system module 200.

In devices 102' and 104', processing module 202 may comprise one or more processors situated in separate components, or alternatively, one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in devices 102' and 104'. Some or all of the functionality commonly associated with the support circuitry may also be included in the same physical package as the processor (e.g., such as in the Sandy Bridge family of processors available from the Intel Corporation).

Processing module 202 may be configured to execute various instructions in devices 102' and 104'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) or read-only memory (ROM) in a fixed or removable format. RAM may include volatile memory configured to hold information during the operation of devices 102' and 104' such as, for example, static RAM (SRAM) or Dynamic RAM (DRAM). ROM may include nonvolatile (NV) memory modules configured based on BIOS, UEFI, etc. to provide instructions when devices 102' and 104' are activated, programmable memories such as electronic programmable ROMs (EPROMS), Flash, etc. Other fixed/removable memory may include, but are not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Power module 206 may include internal power sources (e.g., a battery, fuel cell, etc.) and/or external power sources (e.g., electromechanical or solar generator, power grid, fuel cell, etc.), and related circuitry configured to supply devices 102' and 104' with the power needed to operate. User interface module 208 may include equipment and/or software to allow users to interact with devices 102' and 104' such as, for example, various input mechanisms (e.g., microphones, switches, buttons, knobs, keyboards, speakers, touch-sensitive surfaces, one or more sensors configured to capture images and/or sense proximity, distance, motion, gestures, orientation, etc.) and various output mechanisms (e.g., speakers, displays, lighted/flashing indicators, electromechanical components for vibration, motion, etc.). The equipment in user interface module 208 may be incorporated within devices 102' and 104' and/or may be coupled to devices 102' and 104' via a wired or wireless communication medium.

Communication interface module 210 may be configured to manage packet routing and other control functions for communication module 212, which may include resources configured to support wired and/or wireless communications. In some instances, devices 102' and 104' may comprise more than one communication module 212 (e.g., including separate physical interface modules for wired protocols and/or wireless radios) all managed by a centralized communication interface module 210. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), etc.), short-range wireless mediums (e.g., Bluetooth, WLAN, Wi-Fi, etc.), long range wireless mediums (e.g., cellular wide-area radio communication technology, satellite-based communications, etc.) or electronic communications via sound waves. In one embodiment, communication interface module 210 may be configured to prevent wireless communications that are active in communication module 212 from interfering with each other. In performing this function, communication interface module 210 may schedule activities for communication module 212 based on, for example, the relative priority of messages awaiting transmission. While the embodiment disclosed in FIG. 2 illustrates communication interface module 210 being separate from communication module 212, it may also be possible for the functionality of communication interface module 210 and communication module 212 to be incorporated within the same module.

In the example disclosed in FIG. 2, connection modules 214 and 216 may comprise equipment and/or software configured to interact with at least user interface module 208 and communication module 212 in each of master device 102' and secondary device 104'. In an example of operation, connection module 214 in master device 102' may receive instructions from a user via user interface module 208 for initiating connection setup operations 106, and may interact with communication module 212 in master device 102' during connection setup operations 106 and/or connection establishment operations 110. Moreover, connection setup operations 106 may require interaction with the user of master device 102' to select adapters (e.g., select at least one secondary device 104' to join the group), enter pins, etc. Connection module 216 may likewise interact with communication module 212 in secondary device 104' during connection setup operations 106 and/or connection establishment operations 110. Connection module 216 may further prompt user interface module 208 to present information to a user of secondary device 104' as part of connection setup operations 106. For example, connection module 216 may cause user interface module 208 in secondary device 104' to present a pin for entry into master device 102' during connection setup operations 106.

Figure 3:
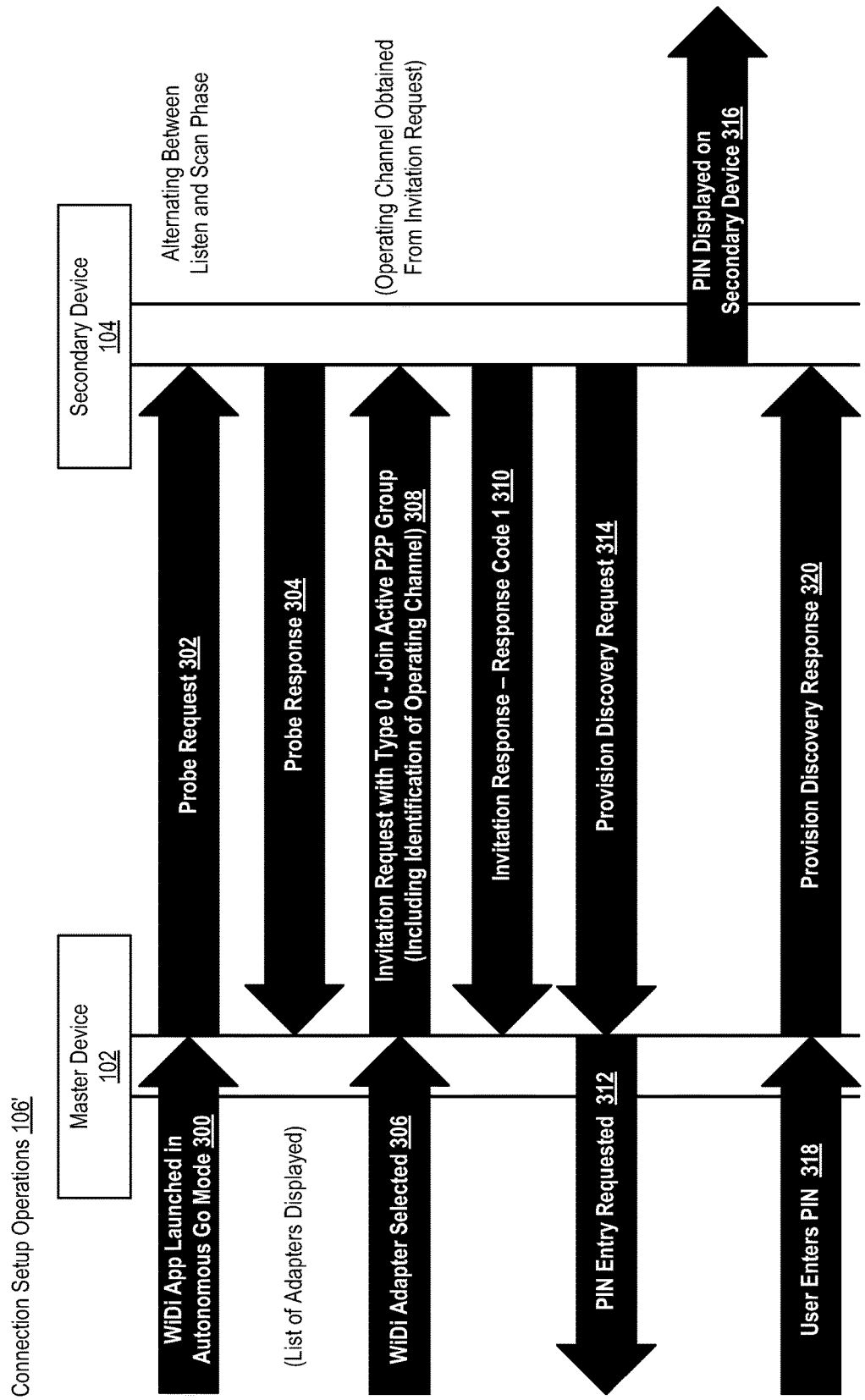
FIG. 3 illustrates example connection setup operations in accordance with at least one embodiment of the present disclosure.

FIG. 3 illustrates example connection setup operations in accordance with at least one embodiment of the present disclosure. Connection setup operations 106' may initiate with a WiDi application (App) being launch in autonomous Go Mode at 300. The launching of the App may cause master device 102 to transmit a probe request 302 (e.g., on a beaconing channel). Secondary device 104 may be alternating between a listening and scan phase, and upon receiving the probe request may transmit probe response 304. After receiving responses from secondary devices 104 within communication range, master device 102 may display a list of adapters for the user to select. The user may select at least one WiDi adapter at 306, and an invitation message 308 may then be transmitted to the selected secondary devices 104. The invitation may comprise information needed for completing connection setup operations 106', and may at least identify an operating channel on which connection establishment operations 110 will initiate. Secondary device 104 may obtain the identity of the operating channel from the invitation and may then transmit invitation response 310.

Operations 312 to 320 may only occur in certain situations (e.g., the first time master device 102 and secondary device 104 are coupled via a direct wireless connection) to verify that master device 102 is connecting to the intended secondary device 104 (e.g., to prevent access being allowed to an incorrect device, such as a device executing a man-in-the-middle attack). In one embodiment, secondary device 104 may transmit provision discovery request 314 to master device 102, causing master device 102 to present a request to a user to enter a PIN that is displayed on secondary device 104. Secondary device 104 may then present a PIN (e.g., may display a PIN to the user) at 316. The user may then enter the PIN displayed on secondary device 104 at 318, which may cause master device 102 to transmit a provision discovery response to secondary device 104, confirming that connection setup operations 106' have completed and that connection establishment operations 110 may now initiate.

Figure 4:
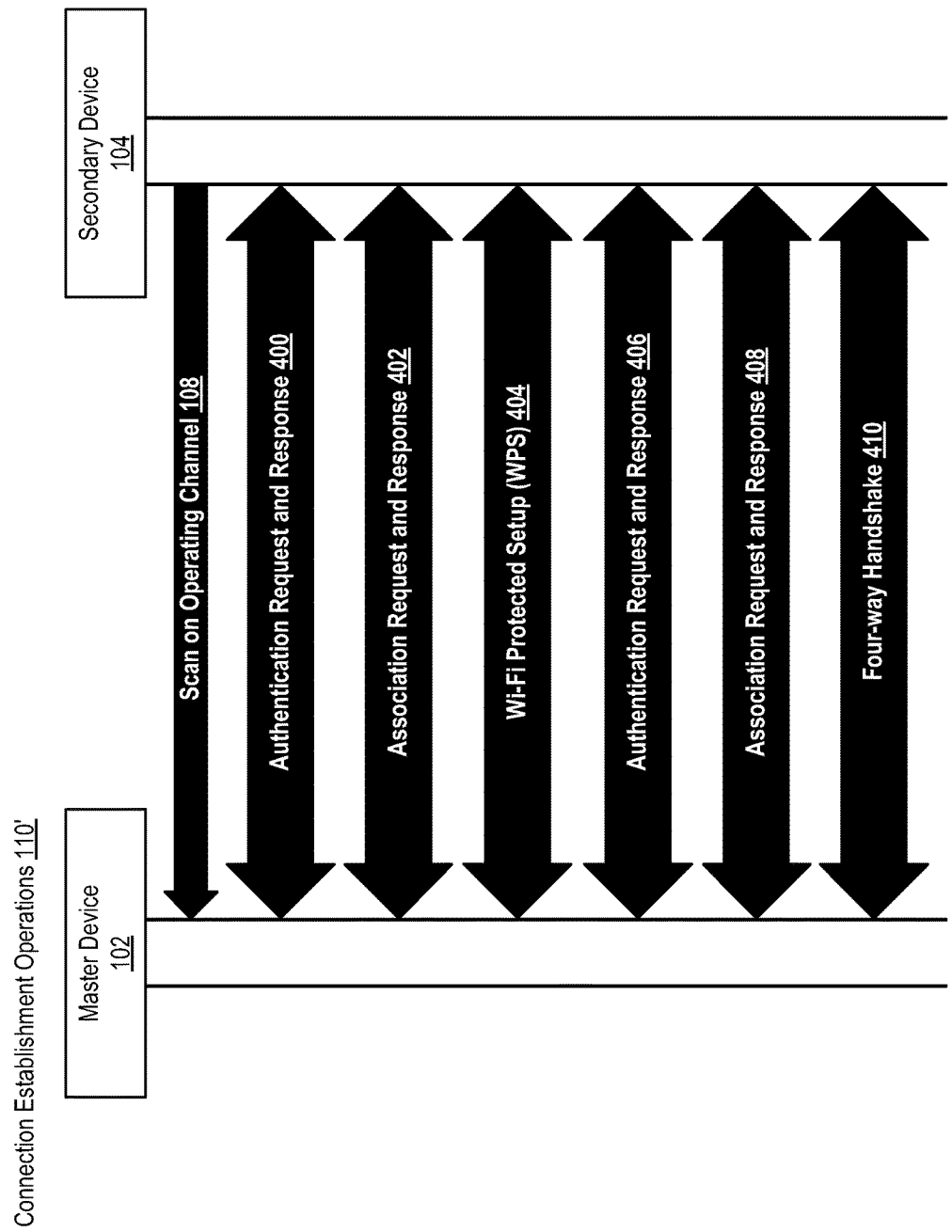
FIG. 4 illustrates example connection establishment operations in accordance with at least one embodiment of the present disclosure.

FIG. 4 illustrates example connection establishment operations in accordance with at least one embodiment of the present disclosure. Connection establishment operations 110' may initiate with secondary device 104 scanning on the operating channel as shown at 108. Scanning on the operating channel may, for example, expedite the initialization of connection establishment operations 110'. In one example implementation, example operations 400 to 410 may comprise standard connection establishment operations 110' corresponding to the particular wireless communication medium being employed by master device 102 (e.g., Wi-Fi). For example, authentication request and response operations as illustrated at 400 may authenticate each device, followed by association request and response operations at 402. Wi-Fi Protected Setup (WPS) may then implement security (e.g., cryptographic keys) for ensuring that only certain devices may engage in a direct wireless connection with master device 102. Following WPS, authentication and/or association may occur again at 406 and 408, respectively, followed by a four-way handshake at 410 including two sets of messages transmitted between master device 102 and secondary device 104 to complete authentication, generate session keys, etc. Following completion of the four-way handshake at 410, master device 102 and secondary device 104 may then interact via direct wireless interaction.

Figure 5:
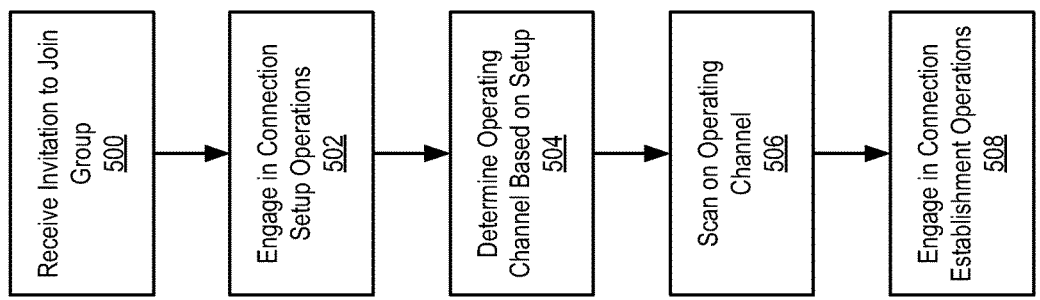
FIG. 5 illustrates example operations for reducing connection time in direct wireless interaction in accordance with at least one embodiment of the present disclosure.

FIG. 5 illustrates example operations for reducing connection time in direct wireless interaction in accordance with at least one embodiment of the present disclosure. Example operations 500 to 508 may be performed by a connection module in a secondary device. In operation 500 a request may be received to join a group. The request may be received from, for example, a master device (e.g., GO of a Wi-Fi Direct network). The secondary device may then engage in connection setup operations in operation 502. During connection setup operations, the secondary device may determine the operating channel on which connection establishment operations will be initiated in operation 504. The operating channel may be determined based on, for example, an invitation message received during connection setup operations. After connection setup operations are complete, the secondary device may then initiate scanning on the operating channel in operation 506, which may help to expedite the commencement of connection establishment operations in operation 508.

While FIG. 5 may illustrate operations according to an embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to reducing connection time in direct wireless interaction. Devices may interact via direct (e.g., device-to-device or "D2D") wireless communication. As part of connection setup operations, a device may receive an invitation to join an existing wireless group. For example, an invitation message may be received by the device on at least one known beaconing channel. The invitation message received by the device may at least identify an operating channel on which connection establishment operations will commence. Following completion of the connection setup operations, the device may initiate scanning on the operating channel identified by the invitation message to expedite the start of connection establishment operations. After connection establishment operations are complete, the device may be able to interact with at least one other device via direct wireless interaction.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for reducing connection time in direct wireless interaction, as provided below.

According to example 1 there is provided a device configured to expedite communication via direct wireless interaction. The device may comprise a communication module to engage in direct wireless interaction with at least one other device and a connection module to cause the communication module to engage in connection setup operations with the at least one other device, determine an operating channel for the direct wireless interaction based on the connection setup operations and cause the communication module to engage in connection establishment operations with the at least one other device on the operating channel.

Example 2 may include the elements of example 1, wherein the direct wireless interaction is based on Wi-Fi Direct communication in accordance with the IEEE 802.11 wireless standard.

Example 3 may include the elements of example 2, wherein the connection setup operations occur on at least one beaconing channel known to devices communicating via Wi-Fi Direct.

Example 4 may include the elements of any of examples 2 to 3, and further comprises a user interface module including at least a display, and the direct wireless interaction is part of a wireless display technology (WiDi) connection.

Example 5 may include the elements of example 1, wherein the connection setup operations comprise at least receiving an invitation to join a direct wireless interaction group.

Example 6 may include the elements of example 5, wherein the invitation to join a direct wireless interaction group comprises at least an invitation request message received via the communication module, the invitation request message at least identifying the operating channel.

Example 7 may include the elements of example 6, wherein the connection module being to determine an operating channel comprises the connection module being to obtain the operating channel from the invitation request message.

Example 8 may include the elements of example 1, wherein the connection module being to cause the communication module to engage in connection establishment operations comprises the connection module being to cause the communication module to scan on the operating channel.

Example 9 may include the elements of example 1, wherein the connection module being to cause the communication module to engage in connection establishment operations comprises the connection module being to cause the communication module to at least transmit at least one of authentication-related, association-related or security-related messages on the operating channel.

Example 10 may include the elements of example 1, wherein the communication module is further to interact with the at least one other device via the direct wireless connection established on the operating channel.

Example 11 may include the elements of example 1, wherein the connection setup operations comprise at least receiving an invitation to join a direct wireless interaction group, the invitation comprising an invitation request message received via the communication module, the invitation request message at least identifying the operating channel.

According to example 12 there is provided a method for reducing connection time via direct wireless interaction. The method may comprise causing a communication module in a device to engage in connection setup operations for direct wireless interaction with at least one other device, determining an operating channel for the direct wireless interaction based on the connection setup operations and causing the communication module to engage in connection establishment operations with the at least one other device on the operating channel.

Example 13 may include the elements of example 12, wherein the direct wireless interaction is based on Wi-Fi Direct communication in accordance with the IEEE 802.11 wireless standard.

Example 14 may include the elements of example 13, wherein the connection setup operations occur on at least one beaconing channel known to devices communicating via Wi-Fi Direct.

Example 15 may include the elements of any of examples 13 to 14, wherein the device further comprises at least a display, and the direct wireless interaction is part of a wireless display technology (WiDi) connection.

Example 16 may include the elements of example 12, wherein causing a communication module in a device to engage in connection setup operations comprises at least receiving an invitation to join a direct wireless interaction group.

Example 17 may include the elements of example 16, wherein the invitation to join a direct wireless interaction group comprises at least an invitation request message received via the communication module, the invitation request message at least identifying the operating channel.

Example 18 may include the elements of example 17, wherein determining an operating channel comprises obtaining the operating channel from the invitation request message.

Example 19 may include the elements of example 12, wherein causing the communication module to engage in connection establishment operations comprises causing the communication module to scan on the operating channel.

Example 20 may include the elements of example 12, wherein causing the communication module to engage in connection establishment operations comprises causing the communication module to at least transmit at least one of authentication-related, association-related or security-related messages on the operating channel.

Example 21 may include the elements of example 12, and further comprises interacting with the at least one other device via the direct wireless connection established on the operating channel.

Example 22 may include the elements of example 12, wherein the connection setup operations comprise at least receiving an invitation to join a direct wireless interaction group, the invitation comprising an invitation request message received via the communication module, the invitation request message at least identifying the operating channel.

According to example 23 there is provided a system including at least a device, the system being arranged to perform the method of any of the above examples 12 to 22.

According to example 24 there is provided a chipset arranged to perform the method of any of the above examples 12 to 22.

According to example 25 there is provided at least one machine readable medium comprising a plurality of instructions that, in response to be being executed on a computing device, cause the computing device to carry out the method according to any of the above examples 12 to 22.

According to example 26 there is provided a device configured for reducing connection time in direct wireless interaction, the device being arranged to perform the method of any of the above examples 12 to 22.

According to example 27 there is provided a system for reducing connection time via direct wireless interaction, comprising means for causing a communication module in a device to engage in connection setup operations for direct wireless interaction with at least one other device, means for determining an operating channel for the direct wireless interaction based on the connection setup operations and means for causing the communication module to engage in connection establishment operations with the at least one other device on the operating channel.

Example 28 may include the elements of example 27, wherein the direct wireless interaction is based on Wi-Fi Direct communication in accordance with the IEEE 802.11 wireless standard.

Example 29 may include the elements of any of examples 27 to 28, wherein the means for causing a communication module in a device to engage in connection setup operations comprise means for at least receiving an invitation to join a direct wireless interaction group.

Example 30 may include the elements of example 29, wherein the invitation to join a direct wireless interaction group comprises at least an invitation request message received via the communication module, the invitation request message at least identifying the operating channel.

Example 31 may include the elements of example 30, wherein the means for determining an operating channel comprise means for obtaining the operating channel from the invitation request message.

Example 32 may include the elements of example 27, wherein the means for causing the communication module to engage in connection establishment operations comprise means for causing the communication module to scan on the operating channel.

Example 33 may include the elements of example 27, wherein the means for causing the communication module to engage in connection establishment operations comprise means for causing the communication module to at least transmit at least one of authentication-related, association-related or security-related messages on the operating channel.

Example 34 may include the elements of example 27, and further comprises means for interacting with the at least one other device via the direct wireless connection established on the operating channel.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A device configured to reduce connection time via direct wireless interaction, comprising:
communication circuitry to engage in direct wireless interaction with at least one other device; and
connection circuitry configured to:
transmit, in response to receipt of a probe request, a probe response to the at least one other device;
cause, following transmission of the probe response, the communication circuitry to engage in connection setup operations with the at least one other device, wherein the connection setup operations comprise receiving from the at least one other device an invitation to join a direct wireless interaction group, the invitation comprising an invitation request message that identifies an operating channel;
determine the operating channel for the direct wireless interaction from the invitation request message; and
responsive to receiving the invitation from the at least one other device, cause the communication circuitry to engage in connection establishment operations with the at least one other device on the operating channel, wherein said connection establishment operations comprise causing the communication circuitry to initiate scanning only on the operating channel identified in the invitation request message.

2. The device of claim 1, wherein the direct wireless interaction is based on Wi-Fi Direct communication in accordance with the IEEE 802.11 wireless standard.

3. The device of claim 2, wherein the connection setup operations occur on at least one beaconing channel known to devices communicating via Wi-Fi Direct.

4. The device of claim 1, wherein the connection establishment operations further comprise causing the communication circuitry to transmit at least one of authentication-related, association-related or security-related messages on the identified operating channel.

5. The device of claim 1, wherein the communication circuitry is further configured to interact with the at least one other device via the direct wireless connection established on the identified operating channel.

6. A method for reducing connection time via direct wireless interaction, comprising:
- transmitting, in response to receipt of a probe request and with connection circuitry of a device, a probe response to at least one other device;
- causing, following transmission of the probe response, communication circuitry in the device to engage in connection setup operations for direct wireless interaction with the at least one other device, the connection setup operations comprising receiving from the at least one other device an invitation to join a direct wireless interaction group, the invitation comprising an invitation request message that identifies an operating channel;
- determining, with the connection circuitry, the operating channel for the direct wireless interaction from the invitation request message; and
- responsive to receiving the invitation from the at least one other device, causing the communication circuitry to engage in connection establishment operations with the at least one other device on the operating channel, the connection establishment operations comprising causing the communication circuitry to initiate scanning only on the operating channel identified in the invitation request message.

7. The method of claim 6, wherein the direct wireless interaction is based on Wi-Fi Direct communication in accordance with the IEEE 802.11 wireless standard.

8. The method of claim 6, wherein the connection establishment operations further comprises causing the communication circuitry to transmit at least one of authentication-related, association-related or security-related messages on the identified operating channel.

9. The method of claim 6, further comprising:
- interacting with the at least one other device via the direct wireless connection established on the identified operating channel.

10. At least one non-transitory machine-readable storage medium having stored thereon, individually or in combination, instructions that when executed by one or more processors result in the following operations for reducing connection time via direct wireless interaction, comprising:
- transmitting, in response to receipt of a probe request and with connection circuitry of a device, a probe response to at least one other device;
- causing, following transmission of the probe response, communication circuitry in the device to engage in connection setup operations for direct wireless interaction with at least one other device, the connection setup operations comprising receiving from the at least one other device an invitation to join a direct wireless interaction group, the invitation comprising an invitation request message that identifies an operating channel;
- determining the operating channel for the direct wireless interaction from the invitation request message; and
- responsive to receiving the invitation from the at least one other device, causing the communication circuitry to engage in connection establishment operations with the at least one other device on the operating channel, the connection establishment operations comprising causing the communication circuitry to initiate scanning only on the operating channel identified in the invitation request message.

11. The non-transitory medium of claim 10, wherein the direct wireless interaction is based on Wi-Fi Direct communication in accordance with the IEEE 802.11 wireless standard.

12. The non-transitory medium of claim 10, wherein the connection establishment operations further comprise causing the communication circuitry to transmit at least one of authentication-related, association-related or security-related messages on the identified operating channel.

13. The non-transitory medium of claim 10, further comprising instructions that when executed by one or more processors result in the following operations comprising:
- interacting with the at least one other device via the direct wireless connection established on the identified operating channel.

* * * * *